United States Patent [19]

Langer et al.

[11] 3,994,789

[45] Nov. 30, 1976

[54] GALVANIC CEMENTATION PROCESS

[75] Inventors: Stanley H. Langer, Madison, Wis.; John Harland Anderson, Prior Lake, Minn.

[73] Assignee: Progressive Scientific Associates, Inc., Prior Lake, Minn.

[22] Filed: Oct. 2, 1974

[21] Appl. No.: 511,358

[52] U.S. Cl. .............................. 204/108; 204/107; 204/106; 204/248
[51] Int. Cl.² ..................................... C25C 1/12
[58] Field of Search ............... 204/106, 248–249, 204/107–108, 118–119

[56] References Cited
UNITED STATES PATENTS

| | | | |
|---|---|---|---|
| 326,760 | 9/1885 | Marchese | 204/108 |
| 626,972 | 6/1899 | Craney | 204/248 |
| 1,483,056 | 2/1924 | Greenawalt | 204/108 |
| 1,817,527 | 8/1931 | Schlotter | 204/DIG. 1 |
| 1,952,850 | 3/1934 | Koehler | 204/249 |
| 2,791,556 | 5/1957 | Pigeon | 204/248 |
| 3,764,493 | 10/1973 | Nicks et al. | 204/248 |
| 3,787,293 | 1/1974 | Kametani | 204/107 |

FOREIGN PATENTS OR APPLICATIONS

| | | | |
|---|---|---|---|
| 12,208 | 8/1888 | United Kingdom | 204/248 |
| 332,244 | 7/1930 | United Kingdom | 204/DIG. 1 |

OTHER PUBLICATIONS

"Modern Electroplating", 2nd Ed., 1963, by F. A. Lowenheim p. 19 The EMF Series of Elements.

Primary Examiner—R. L. Andrews
Attorney, Agent, or Firm—Thomas M. Meshbesher

[57] ABSTRACT

In the disclosed process, the winning of noble or relatively electronegative metals (e.g. Au, Ag, Cu, Ni, etc.) from substantially aqueous solutions containing ions of the metal through the use of relatively electropositive precipitant metals (e.g. Fe, Zn, Al, etc.) is carried out along with recovery or utilization of some of the energy which can be produced by chemical or electrochemical action. In this process, an electrochemical primary cell-like arrangement with a one-fluid or two-fluid electrolyte (wherein the precipitant metal can be an anode) can also provide improvements in the character (orderliness, efficiency, purity of product, etc.) and control of the cementation reactions. For example, bright (high purity) copper can be obtained in a cathode compartment in a two-fluid cell using a scrap iron anode, a pregnant hydrometallurgical cuprous or cupric leach solution as the catholyte, and an external circuit connecting the cathode to the anode. Good copper is also obtained and cementation rates are increased, when the leach solution is used as a one-fluid electrolyte, and an external circuit is maintained. Under some conditions it is advantageous to exclude oxygen from the system.

20 Claims, 4 Drawing Figures

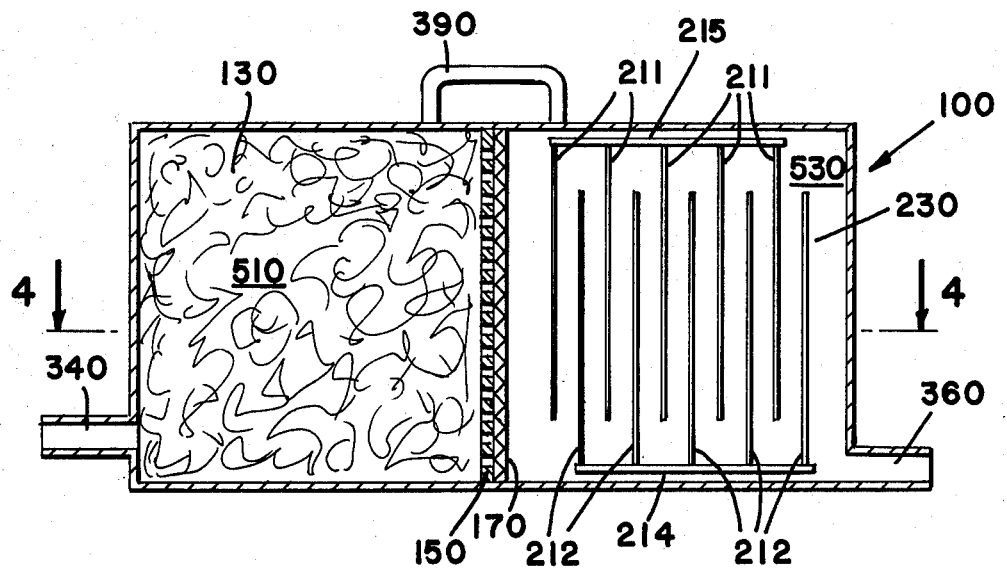
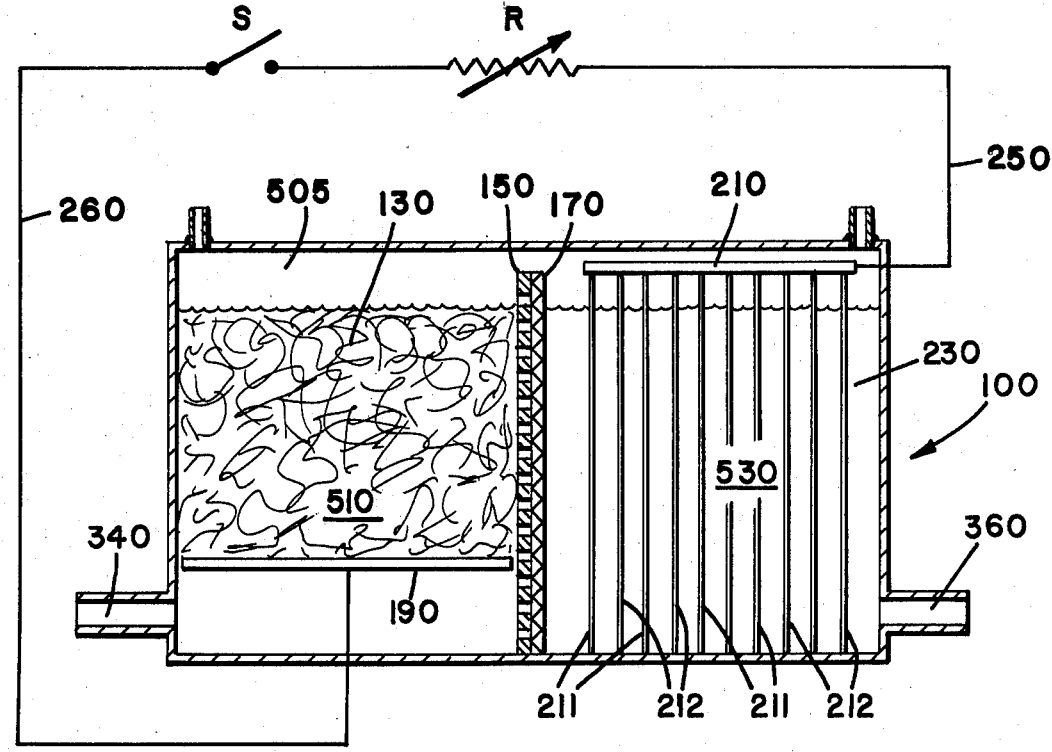

GALVANIC CEMENTATION PROCESS

FIELD OF THE INVENTION

This invention relates to precipitation or recovery of metal from an aqueous solution of metal ions through the use of a relatively more electropositive metal as the precipitating agent. This type of reaction is commonly referred to in the art as "cementation" and can be considered to involve the following overall chemical reaction:

$$nM^{+m} + mN \rightarrow mN^{+n} + nM^0$$

Wherein M is the metal to be precipitated or recovered, $m$ is the ionic valence of M, N is the relatively more electropositive metal, $n$ is the ionic valence of N, 0 represents the metallic state or zero oxidation state.

An aspect of this invention relates to cementation of metals such as nickel, cadmium, tin, lead, copper, silver, and gold with a metal which stands higher in the electromotive series, but generally not higher than aluminum. Another aspect of this invention relates to apparatus and methods for electrolytic comentation of metals from electrolytes containing metal ions. Still another aspect of this invention, under some conditions, is the recovery of useful electrical energy during the cementation process.

DESCRIPTION OF THE PRIOR ART

The cementation of dissolved metal from scrap and ore leach solutions is a common practice in hydrometallurgy. According to the usual practice, a relatively electropositive material or metal is dissolved in a solution containing a relatively less electropositive metal (i.e. a relatively more noble metal), so that the relatively electropositive metal displaces the more noble metal from solution. The precipitated metal is commonly called a "cement" (e.g. "cement copper").

Many cementation reactions have been used industrially or practiced in the laboratory. For a summary of industrial cementations, see Habashi, *Principles of Extractive Metallurgy*, volume 2, chapter 13, Gordon and Breach Science Publications, Inc., New York, 1969. See also Strickland et al., *Proc. Aust. Min. Met.*, 236, pages 25-34 (December, 1970) and the following Reports of Investigations (R.I.'s) of the Bureau of Mines: Fisher et al., R.I. 7761 (1973), 9 pp., and Haver et al., R.I. 7474, particularly pages 14–16, which deal with some of the problems experienced with conventional cementation involving CuCl.

Among the more important cementations are processes for the recovery or precipitation of copper (from cupric ion), silver, lead, cadmium, gold, and gallium. For precipitation or cementation of copper, a variety of relatively electropositive metals have been used, including iron (usually scrap iron), nickel, aluminum (also usually in scrap form), zinc (including zinc-containing alloys and scrap), and the like. Certain of the same metals can be used to cement tin, cobalt, and palladium. Zinc is preferred for cementation of cadmium, and aluminum is preferred for cementation of gallium. The metals being cemented from solution can be dissolved in the form of a simple salt or a complex. Among the typically used simple inorganic salts are the halides, sulfates, chlorates, nitrates, cyanates, and the like. A variety of organic chelating agents have also been used in hydrometallurgy, as have a variety of complex salts including chloride complexes of copper, lead, and silver. Cyanides, ammonia or amine liquids, and the like can also be used to improve the solubility of metal cations.

The cementation reaction of greatest economic importance involves the precipitation of copper cement from solutions of copper (II) ions using scrap iron as the more electropositive metal. In the United States, about 13% of the primary copper production is from this or related cementation reactions. In these reactions, as in other cementation reactions, time, temperature, reaction masses and concentrations, surface area of the precipitating metal, and electrochemical potential differences are all believed to affect efficiency of production and overall yields of metal cement. In the Cu/Fe system in particular, side reactions involving oxygen, hydrogen ions, and ferric ions can affect yield and efficiency. Some studies indicate that the Cu/Fe reaction initially produces iron (II) ions which can be oxidized by atmospheric oxygen to iron (III).

Among the types of apparatus used in commercial practice for copper cementation are the gravity launder, the cone precipitator, the drum precipitator, the activated launder, and the like. These devices are generally designed to facilitate recovery of the metal cement and to promote contact between the scrap metal and the copper bearing solutions. Some of these devices can be adapted for continuous or semi-continuous production, whereby a relatively electropositive metal such as iron is repeatedly added to replace dissolved iron, a copper leach solution or the like is repeatedly added to replace the precipitated copper ions, and the copper cement product is removed to make way for more cementation.

The significance of mass action effects in cementation reactions have been recognized and reported in the more recent chemical literature. Historically, it was assumed that cementation reactions were generally of the nature of a single replacement or chemical substitution reaction. This rationalization prevailed until the 1960's and 1970's. Such studies as Rickard et al., *Trans. Met. Soc. AIME*, 242, pp. 1487–1493 (1968) modelled copper cementation by iron as "a galvanic corrosion cell". See also Strickland et al., *Proc. Aust. Min. Met;* 236, pp. 25–34 (December, 1970) and Fisher et al., U.S. Mines Bureau R.I. 7761 (1973). The model may or may not be correct for all or part of the cementation.

The art of electrowinning of metals (e.g. reduction of metals through electrolysis) has generally been considered to be unrelated to the art of cementation. There would appear to be several reasons for the distinction between the two arts. First, electrowinning of metals typically requires the application of electromotive force to a solution, as typified by the commercial refining of blister copper and other crude copper through electrolysis. Second, local cell action, electrode effects (including the electrolytic production of hydrogen and oxygen), electrode poisoning, electrode polarization, and the like, if they were to occur, could be expected to be detrimental to any electrowinning process. Some of these undesirable effects and side reactions might pose a serious problem in the known electrolysis techniques, but for the proper control of current densities, prepurification and the like and the application of sufficient electrode potential and control of solutions.

Third, mass action or mass transfer effects and the production of useless by-products could be expected to be a detriment to electrowinning processes, except in those processes wherein both the cathode and the anode comprise the same metal (as in refining of copper by electrolysis) or in the "fuel electrode" approach of Juda, U.S. Pat. No. 3,103,474, issued Sept. 10, 1963, wherein hydrogen contributes to a "permanent" anode, and the resulting acidified electrolyte is useful in the regeneration of pickle liquor, e.g. through the formation of a sulfuric acid leach solution.

The fuel electrode approach to electrowinning taught by Juda, as understood by the present applicants, permits some lowering of the electrical energy requirements of the electrowinning system through the oxidation of gases such as hydrogen, carbon monoxide, or other hydrogen ion-producing fuel at the anode, generally with the assistance of a catalyst such as a Group VIII metal (Pt, Pd, etc.).

SUMMARY OF THE INVENTION

It has now been found that cementation reactions can be carried out electrolytically and sometimes chemically, simultaneously in an electrochemical cell, with little or no electromotive force applied to the cell. Problems which might be expected to result from local cell action, electrode effects, electrode poisoning, electrode polarization, inadequate EMF or current density, hydrogen overvoltage, or the like are insignificant or easily controlled. Furthermore, several benefits can apparently be obtained from the electrolytic cementation processes and apparatus of this invention, including improved mass transfer, zero or near zero energy requirements, a metal cement product of great purity, yields of metal cement approaching the maximum theoretical yield, a lower rate of consumption of precipitant metal (and, under some conditions, a higher rate of cementation), simplified recovery or removal of the metal cement product, and improved exposure of surface area on the surface of the precipitant metal. These benefits can be obtained by providing an electrochemical primary cell-like arrangement in which the electrolyte is, at least in part, a dissolved ore (e.g. a hydrometallurgical leach) or an aqueous metal salt or chelate bath obtained by dissolving impure metal or alloys or impure metal compounds (e.g. by dissolving smelted or partially refined metals or impure metal cements, or iron containing other metals scrap, with strong mineral acids and/or chemical oxidizing agents). If desired, this electrolyte can be divided into a catholyte and anolyte, the dissolved ore or other dissolved impure form of the metal being used as the catholyte. This cell is referred to hereinafter as a "primary" cell, since it is operated in a generally irreversible fashion, with the relatively electropositive precipitant metal being supplied to the anode (preferably continuously), where it is sacrificed by substantially spontaneous dissolution. The electrons produced by oxidation are, so to speak, harvested. At least some of the electrons are conducted to the cathode by an external conductor to complete the electrical circuit. A heavy current can be drawn from the system, as in short-circuiting, in which case the "harvested" electrons can be used to discharge cations at the cathode and plate out or precipitate the desired, relatively nobler metal in a form and a purity which substantially resembles electrolytically refined metal. A two-fluid cell incorporating a diaphragm isolating the catholyte from the anolyte can favor this electrolysis effect, with the introduction of a low variable resistor into the external circuit. On the other hand, an electrical load can be placed on the cell, in which case the electrical energy produced at the anode can be harvested to do work (electrolysis), provide electric light, or the like. Both metal cement and plated metal can be produced by drawing a heavy current and omitting the diaphragm.

This invention is particularly well suited to continuous or semi-continuous winning of metals through countercurrent introduction of the precipitant metal and a hydrometallurgical leach solution, a technique used in conventional cementation of copper or the like with a gravity launder, drum precipitator, cone precipitator, or similar cementation apparatus. In this invention, however, the power produced by any local cell action or other chemical or electrochemical effects occuring in the cementation apparatus are not dissipated, but are harvested in the form of direct electric current. So instead of having an energy wasteful, chemical mixing process, we now have a more orderly, efficient chemical process and, as a result, a more efficiently produced product, apparently more efficient consumption of precipitant metal, and the simultaneous production of controllable electric power. When desiring to maintain a lower oxidation state, it has been found useful to further modify conventional copper cementation techniques by providing a copper leach solution (e.g. cuprous halide/alkali metal halide) as the electrolyte and excluding oxygen from this solution.

BRIEF DESCRIPTION OF THE DRAWINGS

FIG. 3 is a top plan schematic view (with top cover removed) of another embodiment of an electrolytic cementation apparatus which is somewhat similar to the embodiment of FIG. 1 except for the design of the cathode.

FIG. 4 is a cross sectional view of the apparatus of FIG. 3 taken along line 3—3.

DETAILED DESCRIPTION OF THE DRAWINGS

Figure 1:
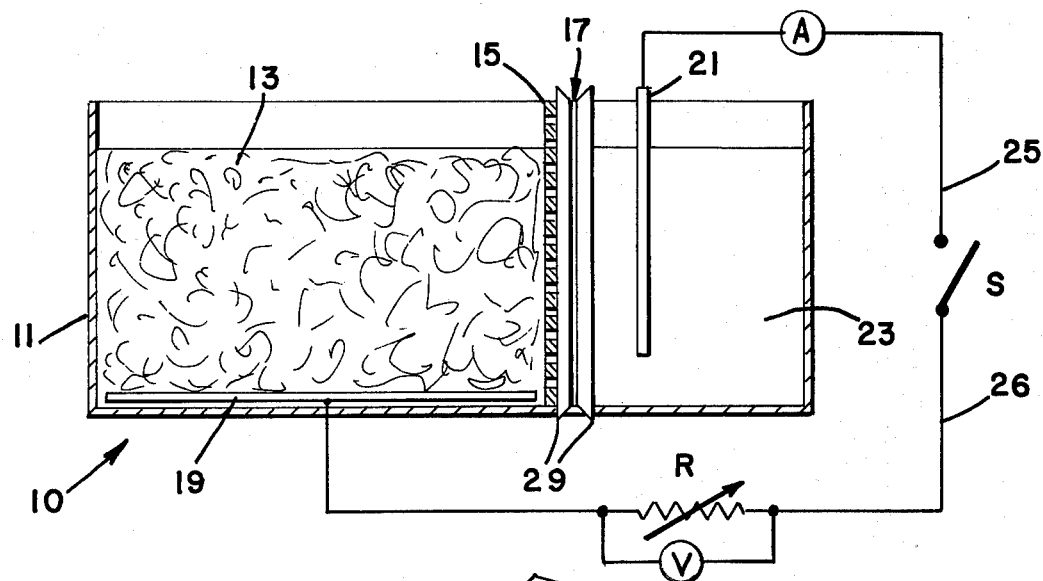
FIG. 1 is a schematic representation of an electrolytic cementation apparatus of this invention, which can be adapted to the concept of the conventional gravity launder cementation apparatus.

The possible ways in which an electrochemical cell configuration could be set up according to the principles of this invention by those with knowledge in the field of electrochemical engineering are far too numerous and varied to be described exhaustively.

In its broadest aspect, an apparatus of this invention can comprise an adaptation of a conventional cementation apparatus (gravity launder, cone precipitator, drum precipitator, activated launder, or the like) to the electrolytic cementation principles of this invention. This generally involves including the precipitant metal as part of an anode, setting up suitable cathodes within the apparatus, utilizing the chemical solution of relatively more noble metal as an electrolyte bridge between the anode and the cathode, and providing an external circuit means for utilizing the potential and current generated. Through electrical insulating techniques known in the art of electrical engineering, these arrangements can be set up so as to prevent undesired electrical shorting (e.g. loss of generated electricity to ground), shorting within the cell between anode and cathode, liquid or piping short circuits, etc.

Throughout this discussion, the terms "internal", "external", and "primary" are intended to have their usual meanings in the field of electrochemistry. That is, the internal portion of an electrochemical cell is generally considered to be the one- or two-fluid electrolyte and the interfaces between the electrodes and the electrolyte. The external portion of the cell is generally considered to be electrical circuitry external to the electrolyte, including conductor means for connecting the cathode to the anode, directly or through a switch, electrical load, or the like. A primary cell is generally considered to be a cell operated in a non-reversible fashion, generally because the reaction at at least one of the electrodes is difficult or uneconomical to reverse. In the present invention, the cell is operated irreversibly for several reasons, including constant and deliberate consumption of the anode metal (necessitating mechanical replenishment of electropositive anode metal to preserve continuity in the process) and repeated recovery of any of the desired relatively nobler metal which plates or forms flaky, powder-like material at the cathode.

A typical electrolytic cementation apparatus of this invention comprises a container means for containing the electrolyte (which is typically a leach solution); a cathode and an anode disposed within the container; a means for repeatedly introducing the leach solution into the container; the external conductor with load or variable resistance for connecting the cathode to the anode; and a means for recovering the desired relatively noble metal from the apparatus. The cathode can be simply a means for establishing electrical contact with the electrolyte (e.g. a carbon rod or an effectively inert metal, a metal oxide electrode, or the like). Alternatively, the cathode can comprise a suitably shaped electrode (sheet, rod, mesh, etc.) made from essentially pure metal corresponding to the metal ions which are to be plated out. The anode is typically an electrically conductive support means for maintaining the relatively electropositive metal in electrolytic contact with with electrolyte. The support means can be in the form of a mesh basket or other porous metal container, or a plastic basket fitted with a provision for electrical contact to the reacting metal anode, or the like into which the electropositive metal can be continuously introduced.

FIG. 1 illustrates a typical arrangement of cathode, anode, electrolyte, and external circuit based in part on the design of a conventional gravity launder. Only one complete compartment of the gravity launder-type device is shown in the drawing; however, it will be understood that a series of descending compartments can be provided to facilitate introduction of leach solution and electropositive metal in the conventional manner.

The portion 10 of the electrolytic cementation apparatus shown therefore comprises a compartment 11 for electropositive metal 13 (e.g. scrap iron) and leach solution 23 (e.g. a solution of copper ions obtained by any desired hydrometallurgical technique). The cathode 21 in this apparatus comprises a sheet of essentially pure metal which is relatively less electropositive as compared to metal 13. Electropositive metal 13 is confined by a perforated divider 15 and a bottom portion 19 of the compartment 11. Bottom portion 19 comprises an electrically conductive material such as graphite which does not participate in any electrochemical reactions but which can conduct generated electricity to the rest of the circuit. With suitable electrical insulation areas dividing the anode portion of compartment 11 from the cathode portion, the walls of compartment 11 can also be used as electrodes. In any event, it is preferred to insulate the cathode area from the anode area, e.g. with electrical insulator 29. The pregnant leach liquor 23 which serves as the electrolyte is, in this embodiment, divided into a catholyte and an anolyte by means of diaphragm 17. This arrangement facilitates plating of relatively noble metal at cathode 21 and tends to supress cementation of this metal on the surface of electropositive metal 13. If maximum cementation rate of the more noble metal on electropositive metal 13 is desired, diaphragm 17 can be omitted from the system. An external circuit means comprising lead 25, switch S, lead 26, and variable resistance R completes the electrochemical cell by connecting cathode 21 and bottom portion 19 of the anode. Resistance R can be varied, for example, from 0 to about 1,000 ohms. For most embodiments of this invention, a range of 0–100 ohms is adequate. The resistance R (which can be a variable resistor, a motor, a lighting system, or any suitable electrical load) regulates the current or voltage of the system. Experimental data indicates that varying the resistance over even as small a range as 0–100 ohms helps to regulate the reaction rates, reduces polarization of electrodes and generally helps to control electrochemical reactions and other undesired phenomena. Experimental data also indicate that a higher purity metal product can be obtained through use of the variable resistance; for example, a bright copper virtually indistinguishable from the best electrolytic refined copper (above 99% purity) can be obtained through careful control of the resistance in the external circuit. If desired, an agitation means (not shown) such as a stirrer or circulating pump can be provided in the catholyte and/or anolyte chambers of the apparatus 10 to keep the electrolyte moving and reduce undesired mass action effects. One preferred agitation technique is to keep leach solution 23 flowing from one launder compartment 11 to the next (not shown), as is conventional in gravity launders. The final cementation step may be conventional or over an array of stacked screens, with applied potential.

Figure 2:
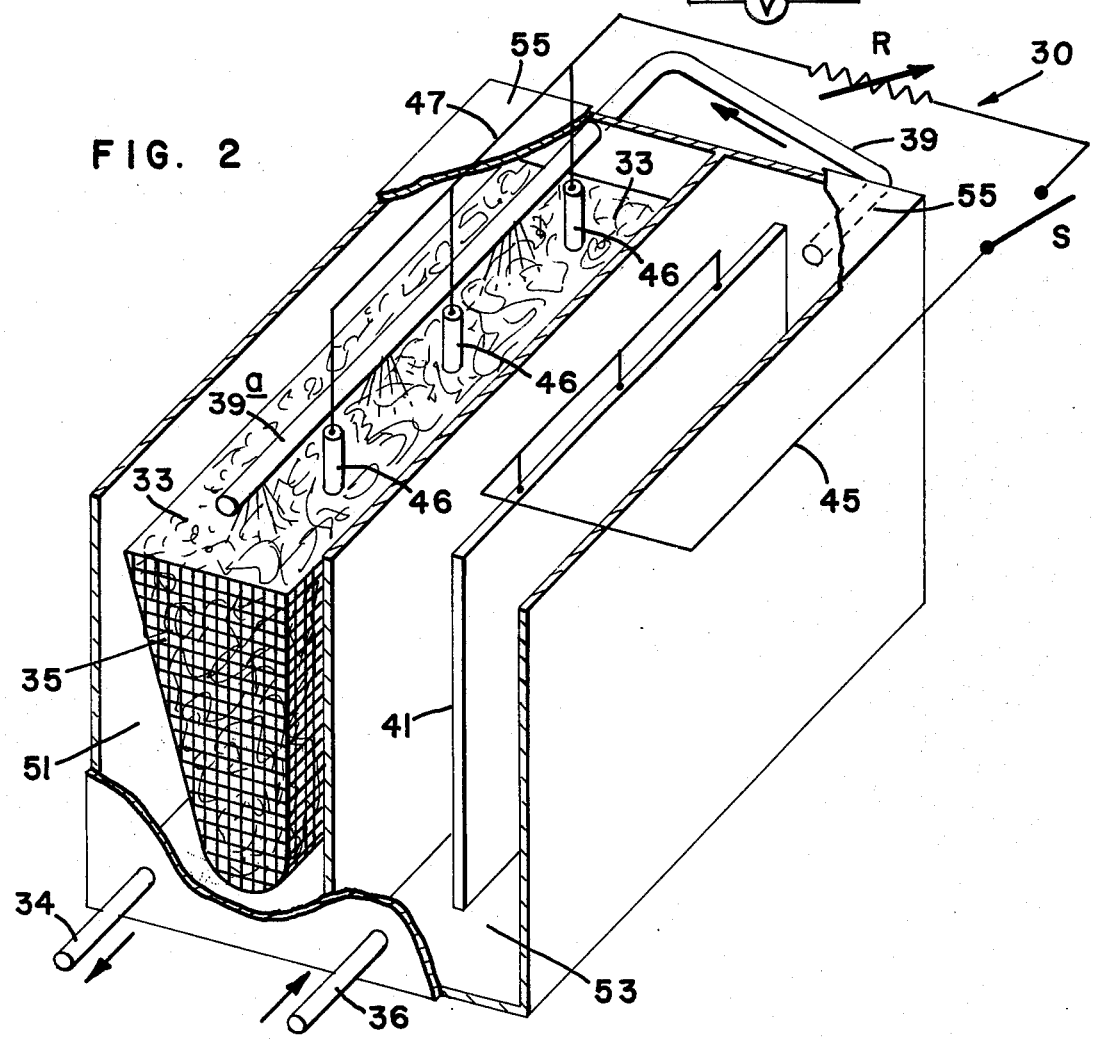
FIG. 2 is a perspective view, with parts broken away, showing another embodiment of an electrolytic cementation apparatus of this invention.

In FIG. 2, another electrolytic cementation device 30 is illustrated. The mesh basket 35 serves as a support means for the electropositive metal (e.g. scrap iron) 33. Electropositive metal 33 is brought into contact with the somewhat depleted pregnant leach electrolyte flowing in from the catholyte chamber 53 through conduit 39; for maximum efficiency, the electrolyte is sprayed from manifold 39a onto the top surface or through the mass of scrap metal 33. Catholyte chamber 53 is provided with an inlet 36 for continuous or semi-continuous introduction of leach liquor, and anolyte chamber 51 is provided with an outlet 34, so that the leach liquor can be discarded, re-used, or the like. If convenient and economical, salts of scrap metal 33 can be recovered from the spent or re-used leach liquor. Depending on a variety of factors described previously, the amount of cementation of more noble metal on the scrap metal anode in the basket 35 can be controlled, and, as in FIG. 1, a support/diaphragm arrangement 37 is provided to separate the device 30 into catholyte (53) and anolyte (51) chambers. The cathode 41 is electrically connected to the scrap 33 in basket 35 through an electrical circuit comprising lead 45, switch S, resistance R, lead 47, and electrically conductive rods 46, which are immersed in the mass of scrap 33. It is advantageous that basket 35 be a foraminous metal or plastic structure which is also electrically connected into this circuit. A cover 55 can be used to exclude air from the interior of device 30, e.g. by retaining a nitrogen, carbon dioxide, or inert gas blanket over the catholyte and anolyte chambers 53 and 51. The exclusion of air is particularly helpful for maintaining the cuprous ions of a copper (I) leach solution (e.g. a mixture containing cuprous and sodium chlorides) in the +1 oxidation state. If desired, pump means (not shown) can be used to provide a flow of leach solution into chamber 53 (through inlet 36), from chamber 53 into chamber 51 (through conduit 39 and manifold 39a), and out of chamber 51 through outlet 34).

This flow can be very effective in minimizing undesired mass transfer and electrical effects by keeping the electrolyte in motion. As mentioned previously, an alternate means for providing the desired electrolyte movement is an agitation means or stirrer.

FIGS. 3 and 4 illustrate another type of cementation device 100, where, much like in FIG. 2, leach liquor 230 is pumped into the cathode chamber 530 through an inlet 360, from chamber 530 to the anode chamber 510 through conduit 390, and from chamber 510 to waste, recycling, re-use, or the like via outlet 340. Conduit 390 can be used to conduct the copper-depleted catholyte to the anode compartment, or one may elect to conduct the copper-containing electrolyte only through the cathode compartment 530, while conducting a copper-free electrolyte through the anode compartment 510. Conduit 390 is not essential to the operation of device 100 and any alternative means for providing movement of leach liquor (electrolyte) and complete recovery of copper and efficient utilization of materials can be used. The space 505 above chambers 530 and 510 can be open to the atmosphere or blanketed with nitrogen, or other inert gases depending on the need for precluding oxidization of dissolved species in the electrolyte. As in FIG. 1, the cathode 210 is electrically connected to the scrap metal 130 in the anode chamber 510 via an external circuit including lead 250, resistor R, switch S, lead 260, and anode element 190. A diaphragm 170 and a foraminous support 150 are provided as described in FIG. 1. Polymeric supports and construction materials can be used. The anode 190 can be constructed so as to constitute a false bottom to facilitate recovery of any anodically produced metal cement from the true compartment bottom, which can be sloped.

The cathode 210 comprises two interleaved multiple plate structures 214 and 215, each of these multiple plate structures comprising a series of plate-like cathode elements, 212 and 214, respectively. An advantage of this flow arrangement of cathode elements is that the more noble metal can be plated on the cathode more effectively or efficiently, since more complete contact with cathode surface by liquid is made. Current and potential measuring equipment can be inserted as desired and appropriate. In any of the foregoing devices (10, 30, 100), a voltage source can be included to impress up to about a volt (e.g. up to 0.9 volt) on the external circuit.

OPERATION OF THE ELECTROLYTIC CEMENTATION DEVICES

For any of the previously described devices, it is assumed that there is a supply of some form of impure or combined, relatively noble metal which is to be won or purified. The source of metal would typically be an ore such as covellite, chalcocite, chalcopyrite, borrite, or any of a variety of sulfides, oxides, basic carbonates, sulfates, etc. of copper, nickel, silver, lead, etc., or mixtures of such ores with a variety of silicates. Scrap metal and other alloys can be used. Acids, oxidizing agents, reducing agents, and other chemicals can be used to leach copper or other metal values or otherwise obtain an aqueous solution containing copper ions, silver ions, etc. Among these chemical agents are sulfur dioxide, perchloric acid, chlorine, sulfuric acid, hydrochloric acid, nitric acid, alkali metal halides, alkaline earth halides, ferric or cupric chloride, etc. and the like. Chelating agents can also be used to facilitate recovery of copper values. As illustrative of the prior art in this field, see U.S. Pat. Nos. 3,288,597; 3,627,476; 3,647,368; and 3,728,430. According to some prior art leaching processes, an electromotive force is used to facilitate production of a cooper or mercury leach solution. Similar technology can be used to produce solutions containing ions of the Group VIII metals, the Group II-B metals, the Group IV-A metals, and the other Group I-B metals.

There are, of course, other conditions under which a solution of ions of a relatively nobler metal would be provided for the process and apparatus of this invention. For example, metals recovered by roasting, chemical reduction with hydrogen or carbon monoxide, or the like are generally in a low state of purity. It is conventional to further refine such metals. Corroded metals, metal alloys, and other impure forms of metals can be purified or separated into metallic constituents by the electrolytic cementation process of this invention. Another source of impure metal includes re-cycled metal compounds or metal compounds produced as by-products, e.g. soluble metal salts such as iron (III) chloride, copper (II) sulfate, impure silver nitrate, etc. Still another source of impure metal includes the various types of industrial scrap such as lead-acid battery scrap, which contains lead (II) sulfate.

Once the ore or impure form or compound of the relatively nobler metal has been converted to an aqueous solution, the aqueous solution can be introduced into an electrolytic cementation apparatus of this invention such that the aqueous solution serves as either the single fluid of a single electrolyte cell or the catholyte of a two-fluid cell. Other organic or inorganic compounds can, of course, be added to the electrolyte. A cathode and an anode are included in the cell, as described previously. The relatively electropositive precipitant metal is introduced at the anode, where current and potential are produced by its action — not so much by chemical means, as in the prior art, but rather by voltaic action caused by the creation of all the conditions necessary for a primary cell, i.e. two unlike electrodes, external circuit means connecting the electrodes and an electrolyte for completing the internal portion of the electrical circuit. To be noted, however, is that in one concept (without diaphragm) chemical action is not excluded, so that displacement may take place from a poised electrode. Since the cell is operated as a primary cell, the relatively electropositive metal (e.g. iron) is consumed rapidly and is repeatedly replenished by mechanical means. Under suitable conditions the current and potential produced by the action of the electropositive metal are harvested at the anode and conducted to the cathode, preferably under regulated conditions, so that the relatively more noble metal can be plated out at the cathode with some control of product yield factors, and/or power recovery. Means can be provided to repeatedly remove electrolytically refined metal from the cathode. Metal cement, if any, formed at the anode can also be removed repeatedly for greater efficiency of cementation. The cement obtained at the anode can be, surprisingly, of somewhat higher purity than conventional metal cement. The cement obtained at the cathode is comparable in purity to electrolytic copper. Mass transfer is facilitated since some metal is produced at sites other than where electropositive ions are formed.

In the art of conventional copper cementation, techniques can be used to continuously supply iron scrap or other relatively electropositive metal to the cementation device while solutions of copper (II) or copper (I) ions or the like are continuously supplied to the container in which the cementation reaction takes place. These techniques, with suitable modifications, are useful in the present invention. As is conventional in cementation reactions, the concentration of ions of the electropositive metal continuously increases as the reaction progresses but if desired, in this invention this increase in concentration can be substantially confined to the anolyte. The resulting solution can be partially discarded and refreshed with leach solution high in the values to be recovered, or alternatively, solutions high in concentrations of salts such as ferric chloride can be recycled for an ore or scrap leach process. If the electropositive metal is iron, and the solution is acidic, it can be oxidized to a higher ferric state for leaching. In the recovery of copper values, copper (II) chloride can be useful in leaching. When a copper (II) leach solution is used so as to result in a cooper (I) electrolyte in the context of this invention, a portion of the copper (I) solution, with a pH below 6, can be re-oxidized electrochemically or with oxygen for recycle to the leach. Alternatively, an air seal or inert gas blanket can be placed over the electrolyte, so that the copper (I) ions will remain substantially stabilized in the +1 oxidation state. Preferred inert gases as nitrogen and argon, and in some cases carbon dioxide can be used. Other means for excluding air from the electrolyte is to pour a liquid organic, lighter-than-water, substantially air-impervious material onto the free surface of the electrolyte, or by floating other impervious-to-air substances on the surface.

As previously noted, a cementation apparatus of this invention need not be the specific structure shown in FIGS. 1 and 2. More complex structures can be used, including series, parallel, or series-parallel arrangements of cells (for increased current densities and/or increased voltages). On the other hand, a relatively simple apparatus comprising little more than a cathode, anode, electrolyte, and an external short circuit can be used according to the principles of this invention.

The materials preferred for use in the operation of this invention will now be described in detail.

ELECTROLYTES

As pointed out previously, the electrolyte can be any of a variety of solutions of metal values, wherein the metal values to be recovered are relatively electronegative compared to the precipitant metal. The electrolyte is "aqueous" in the sense that it contains a major amount of water; however, any suitable organic materials, including chelating or complexing agents, can be added to the aqueous electrolyte for various desired effects. The anions in the electrolyte can thus be simple anions or mixtures of anions such as halides, sulfates, chlorates, nitrates, thiocyanates, and the like or can be complex chlorides, complex cyanides, double salt anions, and the like; suitable mixtures include $Na_2SO_4$/NaCl and/or NaCl/amine, NaCl/ammonium salt, etc. Similarly, the cations can be simple cations or complexes with ligands or chelating agents, e.g. EDTA, mono- or polyamines, ammonia, etc. A particularly preferred electrolyte comprises sodium and/or calcium chloride with or without some ammonium chloride. The pH of the electrolyte can vary, depending upon the characteristics of the impure metal, the leach conditions (acid, basic, or neutral), etc. Acidic electrolytes with a pH ranging from zero to 6 (e.g. 0.5 – 6) are typical. The temperature of the electrolyte (and the operating temperature of the cell) can vary from normal ambient to 90° C., e.g. 20° – 75° C.

In one embodiment of this invention, a two-fluid electrolyte with a diaphragm is used. The diaphragm can be any of the recognized suitable diaphragms such as non-woven polypropylene fiber, acrylic fiber, fiberglass, asbestos, cotton, or other woven or non-woven fabrics, ceramic, or other known diaphragms, resistant to chemical attack by the electrolyte or an ion exchange membrane. In the copper/iron system, for example, the anolyte can be HCl/NaCl and the catholyte can be $CuCl_2$, or, preferably, CuCl/NaCl. In a Cu/Ni, Cu/Zn, or Cd/Zn system, the anolyte can comprise aqueous sulfuric acid while the catholyte can comprise a mixture of copper (II) and nickel sulfate. Mixtures of relatively electropositive metals, metal salts, and the like can be used throughout the system. For example, more than one relatively electronegative metal can be electrolytically cemented seriatim in reverse order to their standing in the electromotive series of metals. For example, in a solution containing ions of Ag(I), Cu(I) or Cu(II), Ni(II), Cd(II), and Zn(II), the precipitant could be serially administered. Copper as the pre-cementing metal (anode) would precipitate the silver, and leave the copper, cadmium, nickel, and zinc in solution. This solution, depleted of silver, could then be given a second electrolytic cementation treatment with a nickel precipitant to cement out the copper. The nickel (II) ions in the effluent from the second cementation could be cemented with cadmium, and the remaining cadmium ions could be cemented with zinc. Similarly a zinc electrode can be used easily and potential adjusted at the cathode to give silver, then, to give copper, etc.

In some instances an outside voltage assist may be added to provide suitable electrode potential characteristics, because of system power losses in the electrolyte or in the external circuit.

Another system of this invention can comprise a cadmium cathode, a mixed cadmium and zinc sulfate catholyte, and a sulfuric acid anolyte. In this system, zinc forms zinc (II) ions and cement cadmium (which can be partly or almost entirely cathodic cadmium plate) is obtained. In this system, one can attempt to minimize hydrogen produced by the common reaction of acid on the two unlike metals by the addition of materials such as ammonium (including quaternary ammonium) salts such as ammonium sulfate, ammonium chloride, phosphoric acid, phosphates, etc. Without such passivators, an electron loss and some precipitant metal loss can occur at the anode, since the anode metal reacts readily with protons to form hydrogen and metal ions. Acid attack with hydrogen evolution on the anode metal does not produce electricity which can be used in the system. Alternatively hydrogen production can be increased, if hydrogen is desired as a by-product.

As noted previously, some conditions permit a combination of chemical cementation with concurrent electrolytic cementation of the relatively more noble metal at the cathode. In the preferred copper/iron system of this invention, this effect can be achieved with a copper (II) electrolyte (e.g. cupric sulfate), particularly when the diaphragm is omitted from the cell. Since one prime goal of this invention can be to maximize the mount of metal recovery per unit time, the loss of electrical efficiency resulting from omission of the diaphragm can be more than compensated by an increased cementation rate.

A preferred electrolyte for the copper/iron system is a copper (I) halide such as CuCl, solublized with the corresponding salt of an alkali metal or alkaline earth metal. By excluding oxygen from the electrolyte, the cuprous halide can be stabilized in its +1 state. There are several advantages to such an electolyte, including the high water solubility of copper (I) chloride/sodium chloride (or similar combinations which can contain some sulfate or other mixtures), the abundance of materials available to make the system, the ease of minimizing hydrogen evolution with addends, and reduced precipitant consumption. To the extent that it does not interface in such a system, sulfate can also be present. A surprising feature of processes of this invention is the ability to cement copper or the like from a highly concentrated aqeous solution, and this is particularly true of the preferred solubilized cuprous salt electrolytes, which can theoretically contain up to about 350 grams per liter of cuprous ion. In actual practice, a cuprous ion concentration of from 0.1 to about 225 g/L. is reasonably practical, the preferred range being about 0,3 – 150 g/L. The optimum range for commercial operation is about 1.0 to about 90 g/L.

In one method of operation according to this invention, wherein the diaphragm is used, the goal is to strip most of the copper from solution by first exposing it to the cathode, and then to pass the copper-depleted solution to the scrap anode to get the last portion of dissolved copper.

THE ANODE METAL

The preferred anode metals of this invention include iron, zinc, aluminum, zinc-containing alloys, and nickel. All of these metals stand above hydrogen in the electromotive series of metals. Metals standing below hydrogen can also be used, however. For example, metallic copper can be used to precipitate gold or silver. The alkali metals and alkaline earth metals, though standing very high in the electromotive series of metals, are not preferred for use in this invention, since they may react vigorously with water. Accordingly, aluminum is typically the most electropositive metal used as the precipitant metal. Gallium is typically the most electropositive metal recovered by cementation, and, of course, aluminum is virtually the only practical precipitant metal suitable for cementation of gallium. Zinc is an extremely useful precipitant metal, since it stands above iron, cadmium, cobalt, nickel, tin, lead, and the Group IB and noble group VIII metals. The electrically conductive support for the anode metal should preferably be resistant to electrochemical action and should not participate in any local cell action. Carbon, corrosion-resistant steel, Group IB metals, and the like can be used to support the oxidizable, electropositive anode metal. Alternatively, the support means can be non-metallic, provided good electrical contact can be maintained between the electropositive metal and the anode lead. Iron is a particularly useful electropositive anode metal for several reasons, including its ready availability as iron or steel scrap. Another anode metal, nickel, is particularly useful in this invention for cementing tin, lead, copper, silver, and gold.

The principles and practices of this invention are illustrated by the following non-limiting Examples.

EXAMPLES 1–14

Method of Determining Data

In all the following Examples, a simple electrolytic cementation apparatus was equipped with a cathode (typically one or two plates of a relatively noble metal), an anode comprising a relatively less noble metal, a voltmeter, and ammeter, a switch, and a variable resistance. When some comparisons with conventional non-electrolytic cementation were desired, the switch was opened; otherwise, it was closed. Conventional cementations were also run. This simple electrolytic cementation apparatus was used to investigate variables such as: different anode metals, different cathode metals, one fluid vs. two fluid electrolytes, various anolytes, various catholytes, exclusion of or access to air, effect of hydrogen gas evolution (and supression thereof), effect of temperatures introducing resistance into the external circuit, and the like. To obtain a two-fluid electrolyte, a diaphragm comprising non-woven polypropylene was used. Two different means were used to exclude air from the system: (1) a "dry box", closed off to the atmosphere and flushed with nitrogen, and (2) an oil barrier on the surface of the electrolyte.

The temperature, as pointed out previously, can vary within fairly wide limits, and temperatures as high as $60^\infty$ C. were tested in connection with systems similar to those illustrated by these Examples. However for the sake of convenience, in the following Examples the temperature was maintained between 20°–25° C. The pH of electrolytes can also vary, as explained in the scientific literature relating to cementation, electrolysis, etc. Since the ordinarily preferred pH range disclosed in the prior art is about 0.5 to about 6, the pH in the following Examples was typically in the range of 1 – 3.5.

In the Tables included in the following Examples, the term "cathode gain" refers to the amount of more noble metal precipitated or plated on the cathode. When the relatively less noble metal is copper, cadmium, or the like, a bright deposit is generally indicative of high purity and a dull deposit may indicate impurities or the like. A negative number in the cathode gain column indicates dissolution of cathode material.

The term "anode loss" refers to the amount of anode metal (e.g. scrap iron, scrap nickel, or some other relatively less noble metal) dissolved or converted to salts.

In the case of Fe/Cu systems, it should be borne in mind that the conversion of two moles of dissolved copper in the cuprous state to two moles of metallic copper accompanied by the formation of a mole of ferrous ion from metallic iron calls for a theoretical Fe:Cu ratio, by weight, of 0.44:1. The conversion of a mole of cupric ion to metallic copper through the oxidation of one mole of metallic iron to ferrous ion, on the other hand, requires twice as much iron (0.88 grams of iron sacrified for every gram of copper obtained). Accordingly, one of the purposes of the Examples is to demonstrate conditions under which the iron/copper (I) system can be successfully operated.

Unless otherwise indicated, all amounts hereinafter are in weight units (e.g. grams) and percentages or in millimoles (mmoles). The cathode gain, the anode loss, and the amount of relatively noble metal cement precipitated out at the anode or on the surface of the less noble metal will always be given in mmoles. For convenience here, the relatively less noble metal is referred to as the "anode", even when no circuit is involved. The presence or absence of electrical events are not implied by this statement.

EXAMPLES 1–3

Iron Precipitant (Anode), Copper Recovered As Less Noble Metal, One-Fluid Electrolyte In these Examples, two copper cathodes and one iron anode were used, with resistance in the external circuit. Further description of the conditions for production of metallic copper and data regarding the results are given in Table I, below. Amounts given in Table I for cathode gain are equal to the total recovered from both cathode elements.

TABLE I

| EXAMPLE NO.: | Examples 1–3 (See Comments Below) | | |
|---|---|---|---|
| | 1 | 2 | 3 |
| Electrolyte Solution: | $CuSO_4$/ dil. $H_2SO_4$ | $CuCl_2$/ dil. HCl | $CuCl_2$/ dil. HCl |
| Cathode Gain (mmoles) | 2.68 | 2.52 | 2.22 |
| Anode Loss (mmoles) | 6.64 | 7.70 | 6.98 |
| Anode Cement (mmoles) | 2.52 | 4.25 | 4.1 |
| Wt. Ratio Fe:Cu | 1.12:1 | 1:1 | 0.977:1 |
| Voltage (closed circ.) | 0.1 | 0.05 | 0.02 |
| Current (amps) | .01 | .07 | .09 |
| Electricity in Coulombs, [mmoles] | 540 [5.6] | 513 [5.3] | 649 [6.73] |
| Time (approx.) | 2 hours | 2 hours | 2 hours |
| Yield per Hour (grams) | 0.165 | 0.215 | 0.20 |

COMMENTS

Example 1: The system was exposed to air. Gas (presumably hydrogen) evolved from the system during the electrolytic cementation. Both the copper produced at the cathodes and the copper produced at the anode was bright. Iron consumption appeared to be higher than can be accounted for by cementation and electricity generation, presumably because of displacement of hydrogen ion by iron. Since no diaphragm was used, there was only one electrolyte fluid, which contained copper sulfate and dilute sulfuric acid.

Example 2: This Example was similar to Example 1 except that cupric chloride was substituted for copper sulfate. Again, the system was exposed to air, there was no diaphragm, and gas evolution was observed. Copper obtained at both the cathodes and the anode was bright. Iron consumption was again higher than can be accounted for by electricity generated and the iron requirements for cementation.

Example 3: This Example was similar to Example 2 except that air was excluded from the system by placing the apparatus in the dry box flushed with nitrogen. Apparently, two moles of electrons were needed to precipitate a mole of copper, as in the preceeding Examples; however, the iron consumption/copper recovered ratio appeared to be slightly improved.

EXAMPLE 4

Cu/Fe — Two-Fluid Electrolyte

This Example involved a copper sulfate solution (15.7 g/L) and iron and copper electrodes. The estimated electricity generated was within about 10% of the amount of copper deposited on the cathode. A polypropylene diaphragm was used, thereby providing a two-fluid electrolyte, i.e. a catholyte solution and an anolyte solution. The amount of copper cement at the anode was decreased in this type of system. Ammonium sulfate, 1 gram in 100 milliliters, was added to the anolyte to suppress gas production, with some apparent success. This is apparently reflected in the decreased iron consumption/copper recovery ratio.

| | Electrolyte |
|---|---|
| Catholyte: | Copper Sulfate, dilute sulfuric acid (200 ml) |
| Anolyte: | Ammonium Sulfate, dilute sulfuric acid (90 ml) |
| Cathode Gain: | 3.31 mmoles |
| Iron Anode Loss: | 2.69 mmoles |
| Anode Cement: | Small amount |
| Weight Ratio, Fe:Cu: | 0.715:1 |
| Voltage, Closed Circuit: | 0.02–0.01 volts |
| Current: | 0.045 amps |
| Electricity: | 566 coulombs (5.86 mmoles) |
| Time: | Approximately 3.5 hours |
| Yield per Hour: | 0.06 grams |

Appearance of Copper Obtained at Cathode: Bright

EXAMPLES 5 and 6 and Open Circuit Control "a"

The purpose of these Examples was to investigate the possibility of producing electrolytic cementation and/or conventional cementation copper by a "one electron change", i.e. in an iron/cuprous ion system. The data appeared to support the conclusion that only about a mole of electrons was needed to produce each mole of copper.

For purposes of comparison, a conventional solution cementation was run to measure anode loss, amount of cementation, yield per hour of copper, and the purity of the copper cement. The open circuit control experiment is hereinafter referred to as Control "a". Stirring took place in cathode compartments and Control "A"; ratio of anode:cathode volumes (Ex. 5 and 6) was 1:2.

The data for these two Examples and the Control are given in Table II.

TABLE II

| | Examples 5, 6, & Control (See Comments Below) | | |
|---|---|---|---|
| EXAMPLE NO. | 5 | 6 | Control "A" |
| Catholyte Solution: | CuCl/NaCl dil. HCl | Conc. CuCl/NaCl | CuCl/NaCl solution |
| Anolyte Solution: | NaCl, $NH_4Cl$** | NaCl*, $NH_4Cl$ | Solution |
| Cathode Gain (mmoles) | 25.5 | 9.3 | — |
| Anode Loss (mmoles) | 10.75 | 18.1 | 27 |
| Anode Cement (mmoles) | some | 24.8 | 53.5 (physically separated) |
| Wt. Ratio Fe:Cu | 0.457:1 | 0.462:1 | 0.444:1 |
| Voltage | | | |
| Open Circ.: | 0.36 | 0.23 | — |
| Closed Circ: | 0.2 | 0.04 | — |
| Current (amps) | 0.14 | 0.22 | — |
| Electricity in Coulombs, [mmoles] | 2018 [20.9] | 1013 [10.5] | — |
| Time (hours:min.) | 4:30 | 1:13 | 4:00 |
| Yield per Hour (grams) | 0.32 | 1.8 | 0.85 |
| Copper Purity | | | |
| Cathode: | bright | 99.9% | — |
| Anode: | — | 99.9% | 91% |

*90% saturated.
**0.5 gram per 100 ml.

COMMENTS

Example 5: Air was excluded by means of a dry box flushed with nitrogen. No gas evolution was observed. The resistance in the external circuit was varied. Although a diaphragm was used to provide the two-fluid electrolyte, some migration to the iron electrode and simultaneous cementation was observed. Ammonium chloride was added to the anolyte to help suppress hydrogen production. This is apparently reflected in a decreased iron consumption. The copper solution was made by leaching chalcopyrite and metallic copper. It contained about 8.3 grams of copper per liter.

Example 6: Air was excluded from the system with the dry box and nitrogen. Some gas evolution was observed, however. Despite the diaphragm and the two-fluid electrolytes, there was clearly some catholyte migration. Resistance was placed in the circuit, and the resistance appeared to improve the quality of cement. The solution contained about 75 grams of copper per liter. High cuprous ion concentration appears to improve the yield per hour. The electricity generated plus cements is approximately equal to the copper electrode deposited on the copper electrode. The electrode deposited copper plus copper cemented out is approximately equivalent to iron lost at the anode on the basis of a single electron change. The high copper purity at both cathode and anode was considered surprising.

In the conventional cementing experiment, the cemented copper was physically separated from the iron strips for analysis.

EXAMPLES 7–9: Other Metals

In these Examples systems other than the Fe/Cu arrangement was used. Examples 7 and 8 were Cd/Zn systems, and Example 9 was a Cu/Ni system. In all three of these Examples, the more noble metal was plated on copper. A diaphragm was used in Examples 7 and 9 to provide a two-fluid electrolyte; Example 8 involved a one-fluid electrolyte and did not require the diaphragm. In Example 7, the amount of cadmium plated out onto the cathode was not measured. Ammonium ion was added in this Example to help suppress gasing from the zinc anode. The anolyte/catholyte volume was approximately in the ratio of 1:2.

In Example 8, cadmium was cemented electrolytically at the cathode and chemically at the anode. The cathode cadmium approximately corresponded to the coulombs produced. It appeared likely that some zinc loss went into gas production.

In Example 9, the electrolytic cementation of copper was carried out just long enough to demonstrate the ability of the system to recover copper from a mixed nickel/copper solution. The experiment was carried out without a special depassivating treatment of the nickel anode.

In all three Examples, air was excluded from the system using the dry box and nitrogen. Some diffusion or leaking of cupric ion to the anolyte was noted in Example 9.

The data for these Examples is given in Table III below.

TABLE III

| | Examples 7–9 | | |
|---|---|---|---|
| EXAMPLE NO. | 7 | 8 | 9 |
| Catholyte | $CdSO_4$* $H_2SO_4$ | $CdSO_4$ $H_2SO_4$ (no diaphragm) | $NiSO_4$(0.08 moles $Ni^{++}$/liter) $CuSO_4$ dil. $H_2SO_4$ |
| Anolyte | $H_2SO_4$ solution | | $H_2SO_4$ solution |
| Cathode Gain (mmoles) | some contains 0.03 % Zn | 4.3 contains 0.24 % Zn | 0.835 |
| Anode Loss (mmoles) | not measured | 51 | 0.682 |
| Anode Cement | None | 16.15 (1.82 % Zn) | None |

TABLE III-continued

Examples 7-9

| EXAMPLE NO. | 7 | 8 | 9 |
|---|---|---|---|
| Wt. Ratio | not measured | 1.45:1 Zn:Cd | 0.8:1 Ni:Cu |
| Voltage | | | |
| Open Circ: | 0.92 | 0.9 | 0.20 |
| Closed Circ: | 0.04-0.15 | 0.13 | 0.03 |
| Current (amps) | 0.07-0.146 | 0.1 | 0.007 |
| Electricity in Coulombs, [mmoles] | not measured | 1080 [5.6] | approx. 29 [0.3] |
| Time (hours:min) | 3:12 | 3:00 | 1:10 |
| Yield Per Hour (grams) | not measured | 0.765 | 0.043 |

*$CdSO_4$ concentration: 7g/L.; $H_2SO_4$ solution: 30g/L.

EXAMPLES 10-12 and Controls "B" and "C"

The data for open circuit controls "B" and "C" are given in Table IV below. No diaphram was present, of course, during these essentially conventional cementations.

TABLE IV

Controls "B" and "C"

| CONTROL: | "B" | "C" |
|---|---|---|
| Solution: | CuCl/NaCl | $CuSO_4$, dil. acid |
| Anode (precipitant) Loss (mmoles) | 39.8 | 83.5 |
| Anode Cement | 73.1 | 80.8 |
| Wt. Ratio Fe:Cu | 0.478:1 | 0.91:1 |
| Time (hours) | 25 | 24 |
| Yield Per Hour (grams) | 0.185 | 0.213 |
| Copper Purity at "Anode" | about 90% (dark red color) | about 90% (dark red color) |
| Air Excluded | Yes; oil barrier | No |
| Gas Evolved | No | Yes |
| Temperature | 21°-22° C. | 21°-22° C. |

The data for Examples 10-12 are given below in Table V.

TABLE V

Examples 10-12

| EXAMPLE NO. | 10 | 11 | 12 |
|---|---|---|---|
| Catholyte: | CuCl/ NaCl | $CuSO_4$ dil. acid | CuCl/NaCl dil. HCl |
| Anolyte: | HCl, dil. | | Conc. NaCl dil. HCl |
| Cathode Gain (mmoles) | 18.9 | 24.2 | −4.57* |
| Anode Loss (mmoles) | 55.2 | 98 | 9.32 |
| Anode Cement (mmoles) | 95.6 | 95.5 | 19.55* |
| Wt. Ratio Fe:Cu | 0.424:1 | 0.95:1 | 1.62:1 |
| Voltage (open circ.) | 0.26 | 0.6 | 0.3 |
| Current (amps) | 0.022 | 0.03 | about 0.013 |
| Electricity in Coulombs, [mmoles] | 1669 [17.3] | 2484 [25.8] | 560 [5.8] |
| Time (hours) | 21 | 23 | 11.5 |
| Yield Per Hour (grams) | 0.35 | 0.25 | 0.041 |

*Net Gain (Cathode Loss subtracted from Anode Cement Gain) = 14.98 mmoles

COMMENTS

Example 10: Air was excluded with an oil barrier, and no gas evolution was observed. There was a single-fluid electrolyte. Copper obtained at the cathode was bright; copper at the anode was about 90% pure. A minimum of resistance was used in the external circuit. Total copper yield was better than control "B". Temperature was the same as control "B".

Example 11: Air was excluded with an oil barrier, but some gas evolution was observed. Conditions were similar to Example 10 except that dissolved copper was in the cupric state in a sulfate. Accordingly, the data was consistent with a two-electron system change. Good bright copper was deposited at the cathode, and conventional cement copper was formed at the anode. The combined copper yield was better than control "C". The process was slower than Example 10. Temperature, resistance, etc. same as Example 10.

Example 12: No effort was made to exclude air, and no gas evolution was observed. A diaphragm was used to provide the two-fluid electrolyte. The catholyte turned green, starting at the air/solution/cathode interface (probably due to $CuCl_2$ formation). These oxidizing conditions radically curtailed yield; some copper was lost from cathode, apparently because of dissolution of cathode material Catholyte migration was observed as shown by cement produced at anode. Some resistance was provided in the external circuit.

What is claimed is:

1. A process for improving the purity of copper recovered from a solution containing copper ions, said process comprising the steps of:

a. converting an ore or an impure form or compound of copper into an aqueous solution containing copper ions, said aqueous solution having a pH less than 6 but greater than zero;

b. providing an aqueous electrode-containing primary cell-like system comprising, as at least part of its aqueous electrolyte, the aqueous solution of said step (a); said cell-like system further comprising a cathode; an anode including a precipitant metal which is more electropositive than copper; and external circuit means external to said electrolyte for electrically connecting said cathode to said anode; said aqueous solution of said step (a) being in contact with said cathode;

c. permitting said precipitant metal to oxidize substantially spontaneously;

d. conducting electrons, produced at said anode by said step (c), through said external circuit means to said cathode;

e. recovering metallic copper from said cell-like system, said metallic copper including plated copper obtained at said cathode;

f. prior to said step (e), suppressing the formation of impurities in cement copper cemented at said anode by providing an external resistance or load for said primary cell-like system, said external resistance or load being selected to control the rate of deposition of copper at the cathode and to regulate reaction rates occurring in said cell-like system, including side reactions involving oxygen, hydrogen ions, and iron ions, whereby any cement copper obtained at the anode has a purity in excess of 91% and in excess of the purity of copper cement produced without said resistance or load; and g. replenishing precipitant metal consumed in said step (c).

2. A process according to claim 1 wherein said aqueous electrolyte comprises a catholyte and an anolyte, said catholyte and anolyte being separated by an electrolytically permeable dividing means; wherein said aqueous solution of said step (a) is introduced into said catholyte.

3. A process according to claim 2 wherein the catholyte, after depletion of copper metal values therefrom, is generally continuously caused to flow into said anolyte.

4. A process according to claim 3 wherein copper-containing ions are reduced at said anode to cement copper by chemical action.

5. A process according to claim 2 wherein said step (a) is carried out by contacting said ore or said impure form or said compound with a hydrometallurgical leach solution; wherein the resulting leach solution containing copper values is caused to flow into said catholyte and is depleted of said copper values.

6. A process according to claim 5 wherein the thus-depleted leach solution is caused to flow from said catholyte into said anolyte.

7. A process according to claim 2 wherein said external resistance or load is a variable resistance.

8. A process according to claim 2 wherein said electrolyte further contains a chemical for suppressing the production of hydrogen from reactions at the precipitant metal in the anode.

9. A process according to claim 2 wherein said copper ions are copper (I) ions.

10. A process according to claim 1 wherein said copper ions are copper (I) ions.

11. A process according to claim 10 wherein said precipitant metal is iron.

12. A process according to claim 11 wherein air is excluded from said electrolyte to stabilize the oxidation state of said copper (I) ions.

13. A process according to claim 1 wherein said precipitant metal is selected from the group consisting of zinc, aluminum, nickel, and iron, and mixtures thereof; and wherein said electrolyte contains anions selected from the group consisting of halide, sulfate, and mixtures thereof.

14. A process according to claim 13 wherein air is excluded from said electrolyte, wherein said electrolyte comprises copper (I) halide and an alkali metal or alkaline earth metal halide.

15. A process according to claim 14, wherein ammonium ion is present in said electrolyte.

16. A process according to claim 1 wherein said aqueous electrolyte is a single electrolyte solution 17. A process according to claim 1 wherein said aqueous solution of said step (a) is circulated from said cathode into contact with said anode.

18. A process according to claim 1 wherein said electrolyte further contains a chemical for suppressing the production of hydrogen from reactions at the precipitant metal in the anode.

19. A process according to claim 1 wherein said step (a) is carried out by contacting said ore or impure form or said compound with a hydrometallurgical leach solution; and wherein the resulting leach solution containing copper values is introduced into said electrolyte, whereby both said cathode and said anode come into contact with said leach solution containing copper metal values.

20. A process according to claim 1 wherein said precipitant metal is iron and wherein the aqueous electrolyte contains copper sulfate.

* * * * *

UNITED STATES PATENT OFFICE
CERTIFICATE OF CORRECTION

Page 1 of 2

Patent No. 3,994,789          Dated November 30, 1976

Inventor(s) Stanley H. Langer et al.

It is certified that error appears in the above-identified patent and that said Letters Patent are hereby corrected as shown below:

Column 4, line 4, "harvested" should be in quotes, --"harvested"--.
Column 4, line 19, "harvested" should be in quotes, --"harvested"--.
Column 5, line 6, "internal" should be in quotes, --"internal"--.
Column 5, line 9, "external" should be in quotes, --"external"--.
Column 5, line 13, "primary" should be in quotes, --"primary"--.
Column 8, line 25, for "cooper" read --copper--.
Column 9, line 12, "cement" should be in quotes, --"cement"--.
Column 9, line 15, "cement" should be in quotes, --"cement"--.
Column 9, line 40, for "cooper" read --copper--.
Column 11, line 20, for "mount" read --amount--.
Column 11, line 36, for "interface" read --interfere--.
Column 11, line 39, for "aqeous" read --aqueous--.
Column 11, line 45, for "0,3" read --0.3--.
Column 12, line 48, for "60°°" read --60°--.
Column 12, lines 64-65, "cathode gains" should be in quotes, --"cathode gains"--.
Column 13, lines 33-34, "cathode gain" should be in quotes, --"cathode gain"--.
Column 14, line 31, "dry box" should be in quotes, --"dry box"--.
Column 15, line 1, for "Control 'a'" read --Control "A"--.
Column 15, line 11, "anode" should be in quotes --"anode"--.
Column 15, line 14, for "Control 'a'" read --Control "A"--.
Column 15, line 49, "dry box" should be in quotes, --"dry box"--.
Column 16, line 7, "dry box" should be in quotes, --"dry box"--.
Column 16, line 50, "dry box" should be in quotes, --"dry box"--.

UNITED STATES PATENT OFFICE
CERTIFICATE OF CORRECTION

Patent No. 3,994,789          Dated November 30, 1976

Inventor(s) Stanley H. Langer et al.

It is certified that error appears in the above-identified patent and that said Letters Patent are hereby corrected as shown below:

Column 18, line 43, for "material Catholyte" read --material. Catholyte--.
Column 18, line 54, for "electrode" read --electrolyte--.

Signed and Sealed this

Fourteenth Day of June 1977

[SEAL]

Attest:

RUTH C. MASON
Attesting Officer

C. MARSHALL DANN
Commissioner of Patents and Trademarks